(12) United States Patent
Sella et al.

(10) Patent No.: US 8,811,608 B2
(45) Date of Patent: Aug. 19, 2014

(54) ATTACK-RESISTANT MULTIVARIATE SIGNATURE SCHEME

(75) Inventors: Yaron Sella, Beit Nekofa (IL); Aviad Kipnis, Efrat (IL)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 13/814,425

(22) PCT Filed: Mar. 2, 2011

(86) PCT No.: PCT/IB2011/050888
§ 371 (c)(1),
(2), (4) Date: Mar. 7, 2013

(87) PCT Pub. No.: WO2012/028968
PCT Pub. Date: Mar. 8, 2012

(65) Prior Publication Data
US 2013/0177151 A1    Jul. 11, 2013

(30) Foreign Application Priority Data

Sep. 1, 2010 (IL) .......................................... 207918

(51) Int. Cl.
*H04K 1/00* (2006.01)
(52) U.S. Cl.
USPC .......................................................... 380/30
(58) Field of Classification Search
CPC .......... G06F 7/725; H04L 9/30; H04L 9/3046
USPC ......................................................... 380/30
See application file for complete search history.

(56) References Cited

U.S. PATENT DOCUMENTS

| | | | |
|---|---|---|---|
| 7,100,051 B1 | 8/2006 | Kipnis et al. | |
| 2004/0223616 A1* | 11/2004 | Kocarev et al. | 380/263 |
| 2008/0013716 A1 | 1/2008 | Ding | |
| 2009/0276361 A1* | 11/2009 | Hu et al. | 705/64 |
| 2013/0073855 A1* | 3/2013 | Kipnis et al. | 713/171 |

FOREIGN PATENT DOCUMENTS

FR    2815493 A1    4/2002

OTHER PUBLICATIONS

Sep. 6, 2011 Transmittal of ISR and Written Opinion of international Searching Authority for PCT/IB2011/050888.
Rohit Ahlawat et al., "Fast Generation of Multivariate Quadratic Quasigroups for Cryptographic Applications", 2009.

(Continued)

*Primary Examiner* — Teshome Hailu
(74) *Attorney, Agent, or Firm* — Husch Blackwell LLP (57) ABSTRACT

A cryptographic method, apparatus, and system, including selecting a first multivariate polynomial mapping, which includes first multivariate polynomial equations over first variables in a finite field, defining a second multivariate polynomial mapping, which includes at least some of the first multivariate polynomial equations and further includes second multivariate polynomial equations over the first variables together with second variables in the finite field, generating a public key based on the second multivariate polynomial mapping, and digitally signing a message, using a processor, with a digital signature that is verifiable using the public key and is generated by solving the first multivariate polynomial mapping to find respective first values of the first variables, solving a set of linear equations using the first values to find respective second values of the second variables, and applying a transform to the first and second values so as to generate a vector corresponding to the digital signature, wherein the second values are chosen so that a predefined group of elements of the vector will be zero. Related methods, apparatus, and systems are also described.

23 Claims, 3 Drawing Sheets

(56) References Cited

OTHER PUBLICATIONS

John Baena et al., "Square-Vinegar Signature Scheme" *Post Quantum Cryptography* (Springer-Verlag 2008).

Jintai Ding et al., "Breaking the Symmetry: a Way to Resist the new Differential Attacks" (Oct. 13, 2007).

Jintai Ding et al., "Rainbow, A New Multivariable Polynomial Signature Scheme" *Applied Cryptography and Network Security* 2005, pp. 164-175.

Danilo Gligoroski et al., "A Public Key Block Cipher Based on Multivariate Quadratic Quasigroups" (2008).

Masahito Gotaishi et al., "Dually-Perturbed Matsumoto-Imai Signature Scheme" *IEICE Transactions on Fundamentals of Electronics, Communications and Computer Sciences,* vol. E93A, No. 6, pp. 1078-1085: (Jun. 2010).

Aviad Kipnis et al., "Unbalanced Oil and Vinegar Signature Schemes" (1999).

T. Moh, "A Public Key System with Signature and Master Key Functions," (Oct. 1999).

Mohamed Saied Emam Mohamed et al., "Algebraic Cryptanalysis of MQQ Public Key Cryptosystem by Mutant XL.", 2008.

Jacques Patarin et al., "Flash, A Fast Multivariate Signature Algorithm," *Topics in Cryptology, CT-RSA: The Cryptographers' Track at RSA Conference Proceedings,* pp. 298-307 (2001).

Jacques Patarin, "Hidden Field Equations (HFE) and Isomorphisms of Polynomials (IP): Two New Families of Asymmetric Algorithms" (1996).

Jacques Patarin et al., "Quartz, 128-Bit Long Digital Signatures," (first page), *Proceedings of the 2001 Conference on Topics in Cryptology: The Cryptographer's Track at RSA.*

Albrecht Petzoldt et al., "A Multivariate Signature Scheme With An Almost Cyclic Public Key", Sep. 2009.

Christopher Wolf, "Efficient Public Key Generation For Multivariate Cryptosystems" (Aug. 6, 2005).

Christopher Wolf et al., "Taxonomy of Public Key Schemes Based on the Problem of Multivariate Quadratic Equations," (May 12, 2005).

\* cited by examiner

ATTACK-RESISTANT MULTIVARIATE SIGNATURE SCHEME

RELATED APPLICATIONS

The present application is a 35 USC §371 application of PCT/IB2011/050888, filed on 2 Mar. 2011 and entitled "Attack-Resistant Multivariate Signature Scheme", which was published in the English language with International Publication Number WO 2012/028968, and which claims the benefit of priority from IL Patent Application IL 207918 of NDS Limited, filed 1 Sep. 2010.

FIELD OF THE INVENTION

The present invention relates generally to methods and systems of cryptography, and specifically to public-key signature schemes.

BACKGROUND OF THE INVENTION

Public-key cryptographic techniques are widely used for encryption and authentication of electronic documents. Such techniques use a mathematically-related key pair: a secret private key and a freely-distributed public key. For authentication, the sender uses a private key to compute an electronic signature over a given message, and then transmits the message together with the signature. The recipient verifies the signature against the message using the corresponding public key, and thus confirms that the document originated with the holder of the private key and not an impostor.

Commonly-used public-key cryptographic techniques, such as the Rivest Shamir Adleman (RSA) algorithm, rely on numerical computations over large finite fields. To ensure security against cryptanalysis, these techniques require the use of large signatures, which are costly, in terms of memory and computing power, to store and compute. These demands can be problematic in applications such as smart cards, in which computing resources are limited.

Various alternative public-key signature schemes have been developed in order to reduce the resource burden associated with cryptographic operations. One class of such schemes is based on solution of multivariate polynomial equations over finite fields. These schemes can offer enhanced security while operating over relatively small finite fields. Most attention in this area has focused on multivariate quadratic (MQ) equations. A useful survey of work that has been done in this area is presented by Wolf and Preneel in "Taxonomy of Public Key Schemes Based on the Problem of Multivariate Quadratic Equations," *Cryptology ePrint Archive*, Report 2005/077 (2005), which is incorporated herein by reference.

U.S. Pat. No. 7,100,051, whose disclosure is incorporated by reference, describes an "Unbalanced Oil and Vinegar" scheme for enhancing the security of public-key signature methods. In the private key representation of the UOV scheme, the variables are divided into two groups: an "Oil" group and a "Vinegar" group. The Oil variables interact with all other variables, while the Vinegar variables do not interact among themselves. In the public key representation, this special structure is concealed using certain linear transformations.

SUMMARY

An embodiment of the present invention provides a cryptographic method, which includes selecting a first multivariate polynomial mapping, which includes first multivariate polynomial equations over first variables in a finite field. A second multivariate polynomial mapping is defined, including at least some of the first multivariate polynomial equations and further including second multivariate polynomial equations over the first variables together with second variables in the finite field. A public key is generated based on the second multivariate polynomial mapping.

A processor digitally signs a message with a digital signature that is verifiable using the public key. The digital signature is generated by solving the first multivariate polynomial mapping to find respective first values of the first variables, solving a set of linear equations using the first values to find respective second values of the second variables, and applying a transform to the first and second values so as to generate a vector corresponding to the digital signature. The second values are chosen so that a predefined group of elements of the vector will be zero.

In a typical embodiment, the method includes conveying the message with the digital signature to a recipient for authentication using the public key, and the first and second multivariate polynomial mappings are quadratic mappings. In some embodiments, the second multivariate polynomial equations are Unbalanced Oil and Vinegar equations, which contain products of the first and second variables but do not contain products of the second variables with one another.

In disclosed embodiments, the second multivariate polynomial mapping includes a first affine transform that mixes the first and second variables and a second affine transform that mixes the first and second multivariate polynomial equations. Typically, computing the digital signature includes defining a private vector including the first and second values, and applying an inverse of the first affine transform to the private vector so as to generate the vector corresponding to the digital signature, and discarding the elements in the predefined group from the digital signature before transmitting the digital signature to a recipient.

In a disclosed embodiment, defining the second multivariate polynomial mapping includes eliminating one or more of the first multivariate polynomial equations from the second multivariate polynomial mapping.

There is also provided, in accordance with an embodiment of the present invention, cryptographic apparatus, including a memory, which is configured to store a private key defining a second multivariate polynomial mapping, which is based on a first multivariate polynomial mapping, which includes first multivariate polynomial equations over first variables in a finite field. The second multivariate polynomial mapping includes at least some of the first multivariate polynomial equations and further includes second multivariate polynomial equations over the first variables together with second variables in the finite field.

A processor is configured to digitally sign a message with a digital signature that is verifiable using a public key based on the second multivariate polynomial mapping. The digital signature is generated by solving the first multivariate polynomial mapping to find respective first values of the first variables, solving a set of linear equations using the first values to find respective second values of the second variables, and applying a transform to the first and second values so as to generate a vector corresponding to the digital signature. The second values are chosen so that a predefined group of elements of the vector will be zero.

There is additionally provided, a computer software product, including a computer-readable medium in which program instructions are stored, which instructions, when read by a computer, cause the computer to store a private key defining a second multivariate polynomial mapping, which is based on a first multivariate polynomial mapping, which includes first multivariate polynomial equations over first variables in a finite field. The second multivariate polynomial mapping includes at least some of the first multivariate polynomial equations and further includes second multivariate polynomial equations over the first variables together with second variables in the finite field.

The instructions cause the computer to digitally sign a message with a digital signature that is verifiable using a public key based on the second multivariate polynomial mapping. The digital signature is generated by solving the first multivariate polynomial mapping to find respective first values of the first variables, solving a set of linear equations using the first values to find respective second values of the second variables, and applying a transform to the first and second values so as to generate a vector corresponding to the digital signature. The second values are chosen so that a predefined group of elements of the vector will be zero.

The present invention will be more fully understood from the following detailed description of the embodiments thereof, taken together with the drawings in which:

DETAILED DESCRIPTION OF EMBODIMENTS

Overview

Embodiments of the present invention that are described hereinbelow provide a method for enhancing the security of existing multivariate polynomial schemes for public-key signature with moderate expansion in signature size and computational cost. These embodiments improve the security of the original scheme, while using relatively short signatures (by comparison with existing enhancement methods such as the ones surveyed in the above-mentioned paper by Wolf and Preneel) and requiring less computation for signature generation than other proposed multivariate polynomial enhancement schemes. The disclosed embodiments are based on multivariate quadratic equations, but the principles of the present invention may be extended, mutatis mutandis, to multivariate polynomial equations of higher order.

Typically, multivariate signature schemes operate as follows: To enable authentication of a message, the sender uses a private key to generate a digital signature over the message. The signature has the form of a vector of values $X=(x_0, \ldots, x_{k-1})$ in a finite field F having p elements. To verify the authenticity of the message, the recipient uses a polynomial mapping, typically having the form of multivariate quadratic mapping Q( ) over F. This mapping comprises a set of multivariate quadratic equations $q_0(\ ), q_1(\ ), \ldots, q_{n-1}(\ )$ of the form:

$$q_i(X) = \sum_{j,k} \gamma_{i,j,k} x_j x_k + \sum_j \beta_{i,j} x_j + \alpha_i$$

The mapping coefficients $\gamma_{i,j,k}$, $\beta_{i,j}$ and $\alpha_i$ are specified by the public key distributed by the sender of the message, i.e., the public key specifies the values of the coefficients that are to be used in the quadratic mapping by the recipient in authenticating the signature. The public key is obtained from the private key by several transformations, including linear mixing of the private key equations, linear mixing of the private key variables, and possibly removal of some of the public equations and variables.

To compute the digital signature, the sender extracts a vector Y of verification values from the message, typically by applying a predefined hash function to the message. The sender then applies a sequence of transformations defined by the sender's private key to find the signature X, and transmits the message and signature together. Upon receiving the message, the recipient uses the same hash function to extract the vector Y, and then uses the public key to verify that Q(X)=Y. The private key transformations are defined, as explained below, so that for the sender, the derivation of the coefficients of the multivariate quadratic mapping Q( ) that make up the public key and the computation of the signature, based on the private key, are straightforward and computationally undemanding operations.

On the other hand, an attacker who wishes to forge public-key signatures must first solve the random set of multivariate quadratic equations that is defined by the public key. Finding this sort of solution is believed to be a hard problem.

In embodiments of the present invention, this problem is made still harder by removal of certain variables and equations from the public key mapping and addition of others, as described hereinbelow.

The public key is distributed openly since it is used for signature verification. The private key is used for signing, and therefore should be known only to the signer. Thus, in the process of generating the public/private key pair, there are secret ingredients that are known only to the signer and cannot be deduced from the public key. The goal of these secret ingredients is to protect the private key from exposure and attack.

In embodiments of the present invention, the definition of the private key takes as its point of departure a first multivariate polynomial mapping, made up of a set of multivariate polynomial equations over a first group of variables in F. Typically, this first mapping has a known "trapdoor," i.e., a computational technique that can be used to efficiently find the values $X=(x_0, \ldots, x_{k-1})$ that solve the mapping for a given Y. This first mapping, which may not be fully secure against attack, is used in defining a second, more secure multivariate polynomial mapping. The second mapping comprises some (but not all) of the multivariate polynomial equations in the first mapping, i.e., some of these equations are eliminated, and is augmented with additional multivariate polynomial equations over the variables in the first group together with some additional variables. Generating this second mapping, which defines the public key, comprises linear mixing of the equations and linear mixing of the variables combined with removal of some variables from the public key. "Removal" of a variable in this context effectively means that it is set to zero.

To generate a digital signature over a message, a processor solves the first multivariate polynomial mapping using a vector of verification values extracted from the message and the known trapdoor, and thus finds respective values of the variables in the first group. The processor then applies these values of the variables in the first group in solving a set of linear equations to find the values of the additional variables. The processor then adds additional linear constraints to guarantee that the solution will also give zero values for the removed variables. The values thus calculated of the variables in the first group and of the additional variables are used together to make up the digital signature.

The removal of some of the equations from the first mapping, the augmentation of the second mapping with additional equations and variables, and the removal of certain variables from the second mapping make it more difficult for an attacker to discover the private key. Variable removal from the public key could add substantial difficulty in computing a signature, since the solution must satisfy additional constraints. Indeed, in some signature schemes that are known in the art, satisfying additional constraints necessitates a search for X by trial and error, in a process that can be computationally expensive. In embodiments of the present invention, however, this difficulty is circumvented because the additional constraints are linear, and they are solved together with the set of linear equations that need to be solved for the second mapping. As a result, all that is required to find the signature, in addition to using the trapdoor of the first mapping, is to solve the above-mentioned set of linear equations, which incurs only a minor added computational burden.

In the embodiments of the present invention that are described hereinbelow, the additional equations and additional variables are defined in accordance with an "Unbalanced Oil and Vinegar" (UOV) scheme, as described, for example, in the above-mentioned U.S. Pat. No. 7,100,051. The Oil variables in this case comprise the first group of variables defined above, while the Vinegar variables comprise the additional variables.

Specifically, in the embodiments of the present invention that are described hereinbelow, the private key is safeguarded against attack by applying two linear affine transformations A and B. The first mixes all the variables to produce a new set of variables. The second mixes the set of quadratic equations in the private key mapping to produce a new set. As described hereinbelow, these affine transforms (or more specifically, their inverses) play a part in generating the linear equations that yield the values of the additional variables.

System Description and Operation

Figure 1:
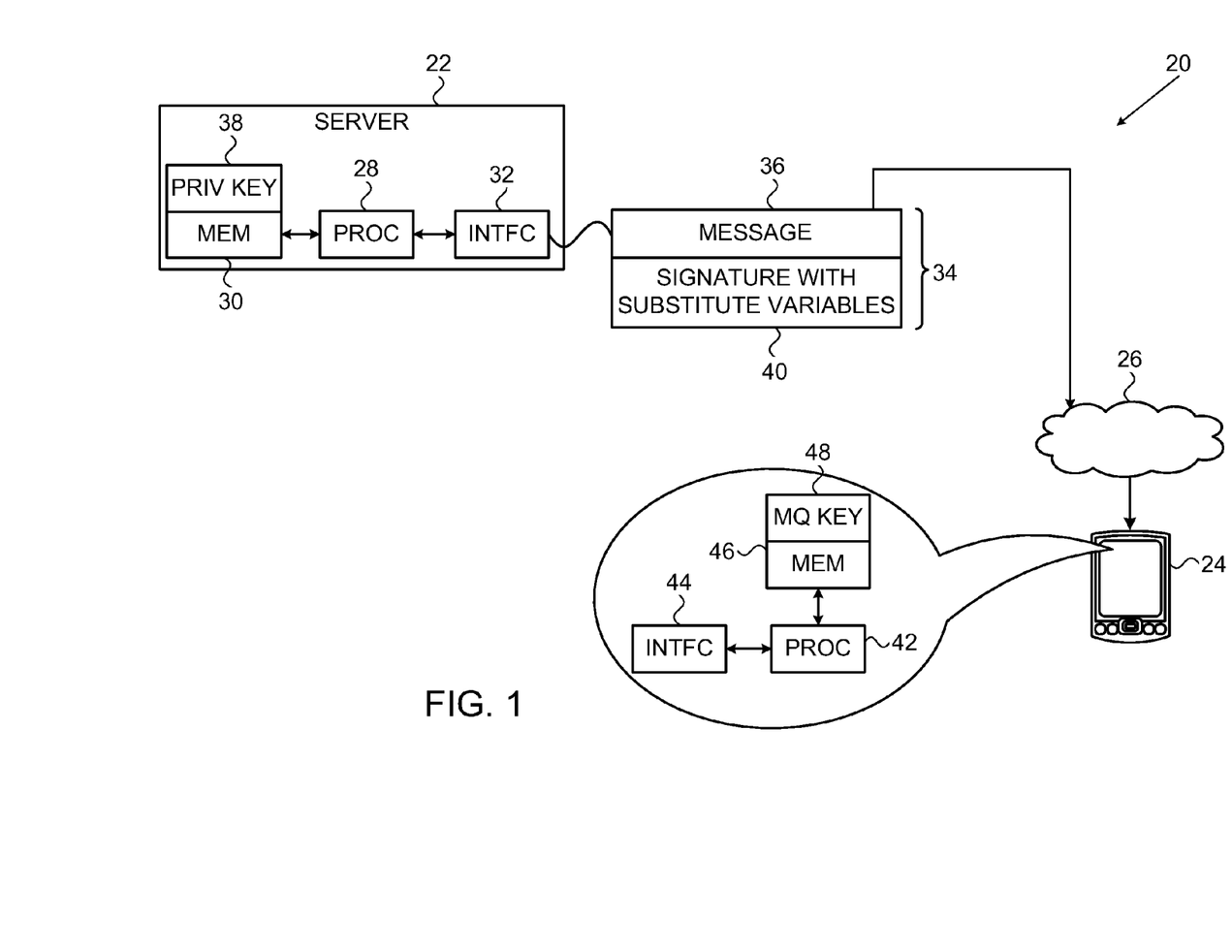
FIG. 1 is a block diagram that schematically illustrates a data communication system in which messages are authenticated using a public-key signature, in accordance with an embodiment of the present invention.

FIG. 1 is a block diagram that schematically illustrates a data communication system 20 using the sort of digital signature scheme that is described above, in accordance with an embodiment of the present invention. System 20 is shown and described here for the sake of example, to illustrate a typical configuration in which such digital signatures may be used, but is not meant to limit the application of such signatures to this sort of context.

In the pictured embodiment, a computer, such as a server 22, transmits data over a network 26 to a receiving device 24. Device 24 may comprise a media player, for example, either fixed or mobile, which comprises an embedded processor or has a plug-in smart card or key. Such devices typically have limited memory and computational resources, making the low resource demands of the present digital signature technique particularly attractive. Alternatively, the recipient of the data may be a general-purpose computer or other computing device.

Before beginning media transmission, server 22 and device 24 conduct an authentication procedure, which may include transmission of one or more authentication frames 34. This procedure may be repeated subsequently if desired. In the example shown in the figure, a processor 28 in server 22 generates a message 36 for transmission to device 24. Processor 28 computes a signature 40, denoted X, over message 36 using a private key 38 that is stored in a memory 30. The signature is computed using substitution of certain variables, as explained above. The server then transmits frame 34, comprising message 36 and signature 40, via an interface 32 over network 26 to device 24.

A processor 42 associated with device 24 receives frame 34 via an interface 44. Processor 42 sets up a quadratic mapping $Q_{PUB}(\ )$ using a public multivariate quadratic (MQ) key 48 that is stored in a memory 46. This key may be preinstalled in memory 46, or it may be downloaded to device 24 from server 22 or from another trusted source. Processor 42 applies the quadratic mapping to signature 40, giving $Q_{PUB}(X)$, and compares the resulting output values to a verification vector, denoted Y, derived from message 36. If processor 42 finds that $Q_{PUB}(X)=Y$, it authenticates the message as having originated from server 22, and media transmission proceeds.

Typically, processor 28, and possibly processor 42, as well, comprise general-purpose computer processors, which are programmed in software to carry out the functions that are described herein. This software may be downloaded to the either of the processors in electronic form, over a network, for example. Alternatively or additionally, the software may be provided on tangible, non-transitory storage media, such as optical, magnetic, or electronic memory media. Further alternatively or additionally, some or all of these processing functions may be performed by special-purpose or programmable digital logic circuits.

As noted above, FIG. 1 shows a certain operational configuration in which the signature scheme described herein may be applied. This same scheme may be applied in signing not only authentication frames transmitting over a network, but also in signing documents and files of other types, whether transmitted or locally stored. For the sake of convenience and clarity, the embodiments and claims in this patent application refer to computation of a signature over a message, but the term "message" should be understood, in the context of the present patent application and in the claims, as referring to any sort of data that is amenable to signature by the present scheme.

Methods of Computation and Authentication

Figure 2:
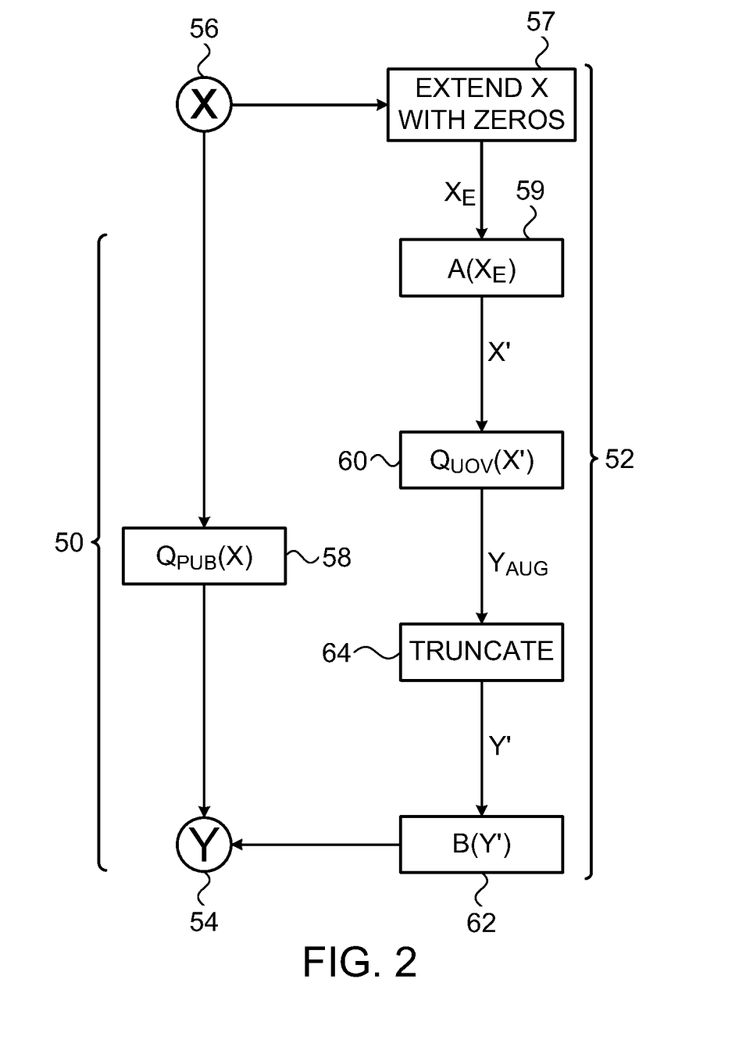
FIG. 2 is a flow chart that schematically illustrates components of public- and private-key signature computations, in accordance with an embodiment of the present invention.

FIG. 2 is a flow chart that schematically illustrates components of public- and private-key signature computations, in accordance with an embodiment of the present invention. The flow chart includes a public key-based computation 50 and a private key-based computation 52, both of which take a signature vector 56, denoted $X=(x_0, \ldots, x_{k-1})$, into a verification vector 54, denoted $Y=(y_0, \ldots, y_{k-1})$. Although the signature and verification vectors are represented, for the sake of convenience, as both having length k, they may alternatively be of different lengths.

Public key-based computation 50, which is conducted by the recipient of the signed message (such as device 24), uses a multivariate quadratic mapping 58, referred to as $Q_{PUB}(\ )$ which is defined by the public key. Computation 50 verifies that $Q_{PUB}(X)=Y$.

Private key-based computation 52 includes a first step 57 of extending X with zeroes in certain coordinates, corresponding to the elements that are removed from the signature vector when the signature is computed. This step gives an extended signature vector $X_E$. A first affine transform 59, having the form of a matrix A, transforms $X_E$ into a private vector X'. A multivariate quadratic mapping 60, denoted $Q_{UOV}(\ )$, operates on X' to generate an augmented vector $Y_{AUG}$. $Q_{UOV}(\ )$ includes additional "Unbalanced Oil and Vinegar" (UOV) variables and equations, as will be described further hereinbelow. $Y_{AUG}$ then undergoes a truncation 64, in which d elements of $Y_{AUG}$ are discarded, thus generating an intermediate vector Y'. This step corresponds effectively to removal of d equations from Q( ) A further affine transform 62, given by a matrix B, transforms Y' into Y.

The signer of a message (such as server 22) performs the inverse steps in computation 52: $B^{-1}$, augment Y' (instead of truncate), $Q_{UOV}^{-1}$, $A^{-1}$, and removal of certain zeroed variables, to derive the signature X from Y. In contrast to multivariate quadratic mapping 58 that is defined by the public key, each of the steps in private key-based computation 52 is easily inverted, using methods described hereinbelow.

Inversion of private key-based computation 52 is facilitated by proper definition of mapping 60. This mapping is built on a basic quadratic mapping Q( ), comprising n multivariate quadratic equations $q_0, \ldots, q_{n-1}$ in k elements of the field F. (Typically, though not necessarily, n≤k.) Q( ) has a known trapdoor, i.e., given a vector Y, it is computationally not difficult to find X satisfying Q(X)=Y. One possibility for this purpose is to use a univariate polynomial function P( ) that corresponds to the multivariate polynomial mapping Q( ). (As explained in the above-mentioned article by Wolf and Preneel, there is a direct correspondence between these univariate and multivariate representations.) The univariate polynomial function operates over the extension field $F_pk$, whose members correspond to vectors having k elements over the base field F. The multivariate mapping in the base field may be framed as an equivalent exponentiation operation $X^d$ in the extension field, which is solved efficiently by taking the inverse power.

To construct $Q_{UOV}( )$, v new Vinegar variables $(x_k, \ldots, x_{k+v-1})$ and vv (<v) new UOV equations are added: $q_n(X), \ldots, q_{n+vv-1}$), to give the mapping $Q_{UOV}$. The coefficients of the new equations may be randomly chosen, but they satisfy the requirement that the coefficients $\gamma_{h,i,j}=0$ when i≥k and j≥k, i.e., the Vinegar variables interact with the Oil variables $(x_0, \ldots, x_{k-1})$, but not with one another. Thus, the UOV equations contain products of the Oil variables with the Vinegar variables but do not contain products of the Vinegar variables with one another.

Finally, a certain number (d) of the equations in Q( ) are discarded, leaving the reduced set of equations $q_0(X), \ldots, q_{n+vv-d-1}(X)$.

The elements of matrices A and B for affine transforms 59 and 62 may be chosen at random, as long as the matrices are invertible. Based on the above definition of $Q_{UOV}( )$ and discarding of equations, B has (n−d+vv)×(n−d+vv) elements, while A has (k+v)×(k+v) elements. Private key 38 (FIG. 1) comprises the elements of matrices A and B and the trapdoor parameters used in inverting the basic quadratic mapping Q( ).

To compute public key 48, the reduced set of equations is mixed by matrix B. Then the vector X' of private-key variables is replaced by a transformed vector $X=A^{-1}X'$. $Q_{UOV}( )$ is now re-written in terms of the new variables X. Finally, r of the elements of X are set to zero, meaning that any multiplicative-term that includes at least one of these elements is removed from the system. The resulting system of quadratic equation is $Q_{PUB}( )$. It is a system of n+vv−d multivariate quadratic equations in k+v−r variables.

In defining the private and public keys for system 20, the operator has some freedom in choosing the numbers of variables and equations. These numbers should be chosen judiciously, however, to ensure that private key-based computation 52 can be easily inverted, while public key-based computation 50 is resistant against attack. To prevent an attacker from separating the Vinegar components from the original mapping Q( ) the number of Vinegar equations vv should not be too small. At the same time, to ensure solvability, the number of Vinegar variables v should be no less than the number of Vinegar equations, i.e., v≤vv. It has also been shown that for a UOV scheme to be secure, the ratio between the numbers of Vinegar and Oil variables, v/k, should be at most ½, and preferably ⅓. Removal of d of the original equations and r of the variables, in conjunction with adding the Vinegar equations and variables, makes the signature scheme more resistant to attack and thus mitigates the above constraints, so that a relative small number of Vinegar equations is sufficient.

The net result, to ensure that the private key-based computation is invertible and that the signature is secure, is that the components of private key-based computation 52 should be defined to satisfy:

$$k+v-r \leq n-d+vv,$$

and $$v > vv+r.$$

Figure 3:
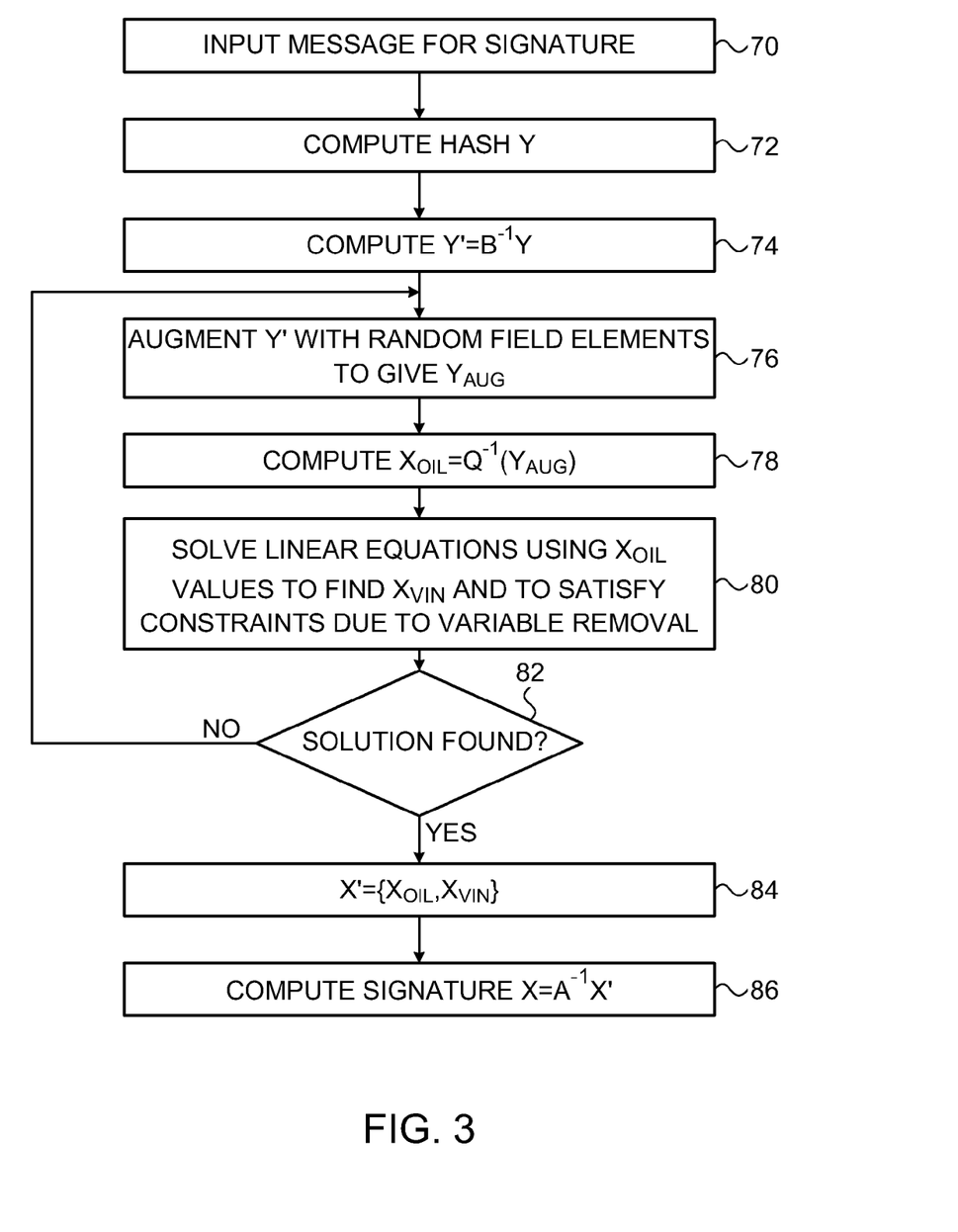
FIG. 3 is a flow chart that schematically illustrates a method for computing a digital signature, in accordance with an embodiment of the present invention.

FIG. 3 is a flow chart that schematically illustrates a method for computing digital signature 40 (X) over a given message 36, in accordance with an embodiment of the present invention. The method begins when processor 28 receives the message for signature, at a message input step 70. The processor extracts a verification vector Y, of length n−d+vv, from the message, typically using a predefined hash function, at a hash computation step 72. Any suitable cryptographic hash function that is known in the art may be used at this step.

Processor 28 applies the inverse matrix $B^{-1}$ to the vector Y, giving the intermediate vector $Y'=(y'_0, \ldots, y'_{n-d+vv-1})$, at a matrix transformation step 74. The processor then generates the augmented vector $Y_{AUG}$ by adding a set of d new variables to Y' and substituting random elements of F for this set of new variables (i.e., complementing the element of the intermediate vector with random values), at an augmentation step 76. The resulting vector has the form: $Y_{AUG}=(y'_0, \ldots, y'_{n-d-1}, r_0, r_1, \ldots, r_{d-1})$, wherein $r_0, r_1, \ldots, r_{d-1}$ are the added random field elements. The processor uses $Y_{AUG}$ with the known trapdoor of the basic quadratic mapping Q( ) to invert the mapping and thus find the values of the oil variables, $X_{OIL}=(x'_0, \ldots, x'_{k-1})$, at an oil solution step 78.

Processor 28 next uses the $X_{OIL}$ values in setting up and solving a system of linear equations in order to find the values of the Vinegar variables, $X_{VIN}=(x'_k, \ldots, x'_{k+v-1})$, and to satisfy the linear constraints that enable public-key variable removal by zeroing these variables, at a vinegar solution step 80. Specifically, the values of the $X_{OIL}$ variables are substituted into the vv Vinegar equations in $Q_{UOV}$, and these equations are set equal to the vv respective values that were found at step 74 for $y'_{n-d}, \ldots, y'_{n-d+vv-1}$. In addition, the values of the $X_{OIL}$ variables are substituted into a group of r linear equations that are defined by corresponding rows of the matrix A, such as the last r rows, with the result set to zero, i.e., $(A^{-1}X')_j=0$ for j=k+v−r to j=k+v−1. These two operations together give a system of r+vv equations in the v vinegar variables of $X_{VIN}$.

As long as the values of r, v and vv are chosen so that r+vv≤v, the system of linear equations should be solvable. Processor 28 checks whether a solution exists for the specific set of Oil variable values in $X_{OIL}$, at a solution checking step 82. If no solution is found, the processor returns to step 76, chooses a new set of random field elements $r_0, r_1, \ldots, r_{d-1}$, and then repeats steps 76 through 80 until a solution is found. Appropriate choice of the numbers of variables and equations will lead to a solution always being found within a small number of iterations.

When the values of the variables in $X_{VIN}$ are found to satisfy the system of linear equations, processor 28 constructs the private vector X' as a concatenation of $X_{OIL}$ and $X_{VIN}$, at a concatenation step 84. It then computes the extended signature vector $X_E = A^{-1}X'$, at a signature output step 86. Because of the linear constraints imposed on the group of r rows of $A^{-1}$ at step 80, a certain group of the elements of $X_E$, such as the last r elements in the present example, are equal to zero and are therefore discarded, giving the signature X. The processor transmits the resulting signature 40 with message 36 to the recipient.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A cryptographic method, comprising:
   selecting a first multivariate polynomial mapping, which comprises first multivariate polynomial equations over first variables in a finite field;
   defining a second multivariate polynomial mapping, which comprises at least some of the first multivariate polynomial equations and further comprises second multivariate polynomial equations over the first variables together with second variables in the finite field;
   generating a public key based on the second multivariate polynomial mapping; and
   digitally signing a message, using a processor, with a digital signature that is verifiable using the public key and is generated by:
      solving the first multivariate polynomial mapping to find respective first values of the first variables;
      solving a set of linear equations using the first values to find respective second values of the second variables; and
      applying a transform to the first and second values so as to generate a vector corresponding to the digital signature,
   wherein the second values are chosen so that a predefined group of elements of the vector will be zero, and the set of the linear equations comprises one or more additional equations chosen so that when the second values satisfy the additional equations, the elements of the vector in the predefined group are guaranteed to be zero.

2. The method according to claim 1, and comprising conveying the message with the digital signature to a recipient for authentication using the public key.

3. The method according to claim 1, wherein the first and second multivariate polynomial mappings are quadratic mappings.

4. The method according to claim 1, wherein the second multivariate polynomial equations are Unbalanced Oil and Vinegar equations, which contain products of the first and second variables but do not contain products of the second variables with one another.

5. The method according to claim 1, wherein the second multivariate polynomial mapping comprises a first affine transform that mixes the first and second variables and a second affine transform that mixes the first and second multivariate polynomial equations.

6. The method according to claim 5, wherein computing the digital signature comprises defining a private vector comprising the first and second values, and applying an inverse of the first affine transform to the private vector so as to generate the vector corresponding to the digital signature.

7. The method according to claim 6, wherein computing the digital signature comprises discarding the elements in the predefined group from the digital signature before transmitting the digital signature to a recipient.

8. The method according to claim 5, wherein computing the digital signature comprises extracting a verification vector from the message, applying an inverse of the second affine transform to the verification vector in order to generate an intermediate vector, and complementing a set of elements of the intermediate vector with random values to generate an augmented vector for use in solving the first multivariate polynomial mapping.

9. The method according to claim 8, wherein complementing the set of the elements comprises generating a first augmented vector containing first random values, and if no solution to the set of the linear equations is found using the first augmented vector, generating a second augmented vector containing second random values, different from the first random values, and repeating the steps of solving the first multivariate polynomial mapping and solving the set of the linear equations using the second augmented vector.

10. The method according to claim 1, wherein defining the second multivariate polynomial mapping comprises eliminating one or more of the first multivariate polynomial equations from the second multivariate polynomial mapping.

11. A computer software product operative to implement the method of claim 1.

12. The method according to claim 1 wherein the first multivariate polynomial equations comprises a trapdoor.

13. The method according to claim 1 wherein the set of linear equations arise from the UOV equations.

14. Cryptographic apparatus, comprising:
   a memory, which is configured to store a private key defining a second multivariate polynomial mapping, which is based on a first multivariate polynomial mapping, which comprises first multivariate polynomial equations over first variables in a finite field, wherein the second multivariate polynomial mapping comprises at least some of the first multivariate polynomial equations and further comprises second multivariate polynomial equations over the first variables together with second variables in the finite field; and
   a processor, which is configured to digitally sign a message with a digital signature that is verifiable using a public key based on the second multivariate polynomial mapping and is generated by solving the first multivariate polynomial mapping to find respective first values of the first variables, solving a set of linear equations using the first values to find respective second values of the second variables, and applying a transform to the first and second values so as to generate a vector corresponding to the digital signature, wherein the second values are chosen so that a predefined group of elements of the vector will be zero, and the set of the linear equations comprises one or more additional equations chosen so that when the second values satisfy the additional equations, the elements of the vector in the predefined group are guaranteed to be zero.

15. The apparatus according to claim 14, wherein the processor is configured to convey the message with the digital signature to a recipient for authentication using the public key.

16. The apparatus according to claim 14, wherein the first and second multivariate polynomial mappings are quadratic mappings.

17. The apparatus according to claim 14, wherein the second multivariate polynomial equations are Unbalanced Oil and Vinegar equations, which contain products of the first and second variables but do not contain products of the second variables with one another.

18. The apparatus according to claim 14, wherein the second multivariate polynomial mapping comprises a first affine transform that mixes the first and second variables and a second affine transform that mixes the first and second multivariate polynomial equations.

19. The apparatus according to claim 18, wherein the processor is configured to compute the digital signature by defining a private vector comprising the first and second values, and applying an inverse of the first affine transform to the private vector so as to generate the vector corresponding to the digital signature.

20. The apparatus according to claim 19, wherein the processor is configured to discard the elements in the predefined group from the digital signature before transmitting the digital signature to a recipient.

21. The apparatus according to any of claim 18, wherein the processor is configured to compute the digital signature by extracting a verification vector from the message, applying an inverse of the second affine transform to the verification vector in order to generate an intermediate vector, and complementing a set of elements of the intermediate vector with random values to generate an augmented vector for use in solving the first multivariate polynomial mapping.

22. The apparatus according to claim 21, wherein the processor is configured to generate a first augmented vector containing first random values, and if no solution to the set of the linear equations is found using the first augmented vector, to generate a second augmented vector containing second random values, different from the first random values, and to repeat the steps of solving the first multivariate polynomial mapping and solving the set of the linear equations using the second augmented vector.

23. The apparatus according to claim 14, wherein one or more of the first multivariate polynomial equations are eliminated from the second multivariate polynomial mapping.

* * * * *

UNITED STATES PATENT AND TRADEMARK OFFICE
CERTIFICATE OF CORRECTION

PATENT NO.        : 8,811,608 B2  Page 1 of 1
APPLICATION NO.   : 13/814425
DATED             : August 19, 2014
INVENTOR(S)       : Sella et al.

It is certified that error appears in the above-identified patent and that said Letters Patent is hereby corrected as shown below:

In the Specification

Column 8, line 2, delete "$v \leq vv.$" and substitute therefor --$v \geq vv.$--.

Column 8, line 16, delete "$k + v - r \leq n - d + vv,$" and substitute therefor --$k + v - r \geq n - d + vv,$--.

Column 8, line 21, delete "$v > vv + r.$" and substitute therefor --$v \geq vv + r.$--.

Signed and Sealed this
Twenty-eighth Day of October, 2014

Michelle K. Lee
*Deputy Director of the United States Patent and Trademark Office*